United States Patent [19]

Okabe et al.

[11] Patent Number: 5,300,157
[45] Date of Patent: Apr. 5, 1994

[54] ALUMINUM-BASED INTERMETALLIC COMPOUND WITH HIGH TOUGHNESS AND HIGH WEAR RESISTANCE

[75] Inventors: Sinji Okabe; Takashi Iwasa; Naoya Watanabe, all of Saitama, Japan

[73] Assignee: Honda Giken Kogyo Kabushiki Kaisha, Tokyo, Japan

[21] Appl. No.: 827,632

[22] Filed: Jan. 29, 1992

[30] Foreign Application Priority Data

Apr. 26, 1991 [JP] Japan .................. 3-122928
Apr. 30, 1991 [JP] Japan .................. 3-124513

[51] Int. Cl.$^5$ .............................. C22C 21/00
[52] U.S. Cl. .............................. 148/437; 148/415; 148/416; 148/417; 148/418; 148/419; 148/438; 148/439; 148/440
[58] Field of Search .............. 148/437, 438, 439, 440, 148/415, 416, 417, , 418, 419

[56] References Cited

U.S. PATENT DOCUMENTS 4,767,678 8/1988 Yates et al. ................. 148/437
5,053,085 10/1991 Masumoto et al. ............. 148/437
5,076,866 12/1991 Koike et al. ................. 148/437

Primary Examiner—R. Dean
Assistant Examiner—Robert R. Koehler
Attorney, Agent, or Firm—Lyon & Lyon

[57] ABSTRACT

An Al-based intermetallic compound in which a eutectic crystal type Al-CuMn intermetallic compound dispersion phase is dispersed in an Al-Cu intermetallic compound matrix phase. The content of Mn as a eutectic crystal-forming element contained in the dispersion phase is set in a range of from 5% by weight (inclusive) to 30% by weight (inclusive). In the course of solidification of the Al-Cu-Mn intermetallic compound, an infinite number of dispersion phases are first crystallized, and the matrix phase is then crystallized. This ensures that the matrix phase is formed into a fine crystal structure due to hindrance of the growth thereof by the dispersion phase, leading to increases in hardness and toughness of the resulting Al-based intermetallic compound. In another embodiment, the Al-based intermetallic compound contains peritectic type Al-based intermetallic dispersion phase, such as formed by Ta, dispersed in the intermetallic compound matrix phase.

14 Claims, 11 Drawing Sheets

ALUMINUM-BASED INTERMETALLIC COMPOUND WITH HIGH TOUGHNESS AND HIGH WEAR RESISTANCE

BACKGROUND OF THE INVENTION

1. Field of the Invention

The field of the present invention is aluminum-based (Al-based) intermetallic compounds with a high toughness and a high wear resistance.

2. Description of the Prior Art

There are conventionally known Al-based intermetallic compounds containing Ni as an intermetallic compound forming element (for example, see Japanese Patent application Laid-open No. 166982/86).

However, the prior art Al-based intermetallic compounds are accompanied by a problem that the entire compound comprises an aluminum/nickel-based compound phase and hence, it has a high hardness and thus a high wear resistance, but is brittle and has a low toughness.

SUMMARY OF THE INVENTION

Accordingly, it is an object of the present invention to provide an Al-based intermetallic compound of the type described above, wherein the above problem is overcome by incorporating a eutectic crystal-forming element capable of eutectic reaction with Al.

To achieve the above object, according to the present invention, there is provided an Al-based intermetallic compound having a high toughness and a high wear resistance, which contains a eutectic crystal-forming element capable of eutectic reaction with Al in an amount of from 5% by weight (inclusive) to 30% by weight (inclusive), the eutectic crystal-forming element being in at least one of a form of a solid solution incorporated into an Al-based intermetallic compound matrix phase and a form of a eutectic crystal type Al-based intermetallic compound dispersion phase dispersed into the Al-based intermetallic compound matrix phase.

It is another object of the present invention to provide an Al-based intermetallic compound of the type described above, wherein the above-described problem is overcome by forming the Al-based intermetallic compound into a multiple-phase structure comprising different compound phases.

To achieve the above object, according to the present invention, there is provided an Al-based intermetallic compound having a high toughness and a high wear resistance, which contains a peritectic-forming element capable of peritectic reaction with Al in an amount of 5% by weight (inclusive) to 30% by weight (inclusive), at least a portion of the peritectic-forming element forming a peritectic type Al-based intermetallic compound dispersion phase dispersed into an Al-based intermetallic compound matrix phase.

According to any of the above-described features, it is possible to provide an Al-based intermetallic compound having a high toughness and a high wear resistance.

The above and other objects, features and advantages of the invention will become apparent from a consideration of the following description of the preferred embodiments, taken in conjunction with the accompanying drawings.

BRIEF DESCRIPTION OF THE DRAWINGS

The drawings illustrate embodiments of the present invention, wherein.

DESCRIPTION OF THE PREFERRED EMBODIMENTS

Figure 1:
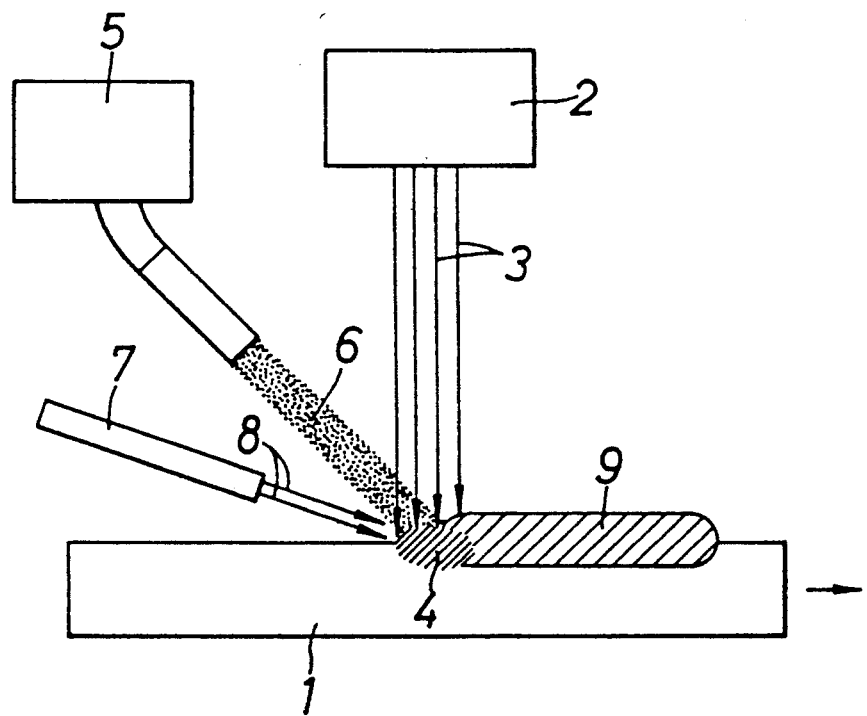
FIG. 1 is an illustration for explaining a process for producing an Al-based intermetallic compound.

FIG. 1 illustrates a process for producing the first embodiment of an Al-based intermetallic compound of this invention. In carrying out this process, a base material 1 of aluminum or an Al-based alloy is moved in the direction of the arrow, and the surface thereof is melted by a laser beam 3 which is projected from an oscillator 2. A powder 6 consisting of a matrix phase-forming element and a eutectic crystal-forming element is sprayed into a molten pool 4 of such surface from a power feeder 5 by the aid of a carrier gas and at the same time, a shield gas 8 is injected from a gas feed nozzle 7 to the molten pool 4. As a result of cooling of the molten pool 4, an Al-based intermetallic compound 9 is formed on the base material 1.

The matrix phase-forming element combines with Al to form an Al-based intermetallic compound matrix phase. The eutectic crystal-forming element is in at least one form selected from the form of a solid solution incorporated into the matrix phase, and the form of eutectic crystal type Al-based intermetallic compound dispersion phase dispersed into the matrix phase.

Therefore, the Al-based intermetallic compound is of any one constitution selected from a constitution comprising the eutectic crystal forming element in the form of a solid solution incorporated into the matrix phase; a constitution comprising the dispersion phase dispersed into the matrix phase; and a constitution comprising the eutectic crystal-forming element in the form of a solid solution incorporated into the matrix phase and the dispersion phase dispersed into the matrix phase.

For the Al-based intermetallic compound having the eutectic crystal forming element in the form of a solid solution incorporated therein, a high hardness and thus a high wear resistance and a high toughness can be insured by the solution. For the Al-based intermetallic compound having the dispersion phase therein, an infinite number of dispersion phases are first crystallized and the matrix phase is then crystallized in the course of solidification of the compound. Therefore, the matrix phase is formed into a fine crystal structure due to hindrance of the growth of the crystal by the dispersion phase. This makes it possible to insure a high hardness and thus a high wear resistance and a high toughness of the Al-based intermetallic compound.

The content of aluminum in the Al-based intermetallic compound is set in a range of from 30% by weight (inclusive) to 50% by weight (inclusive) for the purpose of insuring a high hardness of the compound. If the Al content is less than 30% by weight, no matrix phase is formed, resulting in a tendency to reduce the hardness. On the other hand, if the Al content exceeds 50% by weight, a reduction in hardness of the resulting Al-based intermetallic compound is brought about.

The matrix phase-forming element is at least one element selected from the group consisting of Ni, Cu, Co, Fe and Mn, and the content of the element is set in a range of from 30% by weight (inclusive) to 70% by weight (inclusive) for the purpose of insuring a high hardness of the resulting Al-based intermetallic compound. If the content of the matrix phase-forming element is less than 30% by weight, no matrix phase is formed, resulting in a tendency to reduce the hardness. On the other hand, if the content of the matrix phase-forming element exceeds 70% by weight, the resulting Al-based intermetallic compound is embrittled.

The eutectic crystal-forming element is at least one element selected from the group consisting of Ni, Cu, Co, Fe, Mn, Ag, Pd, Pt, La, Ce, Li and Mg, with the proviso that the eutectic crystal-forming element used cannot be the same as the matrix phase-forming element used. The content of the eutectic crystal-forming element is set in a range of 5% by weight (inclusive) to 30% by weight (inclusive) for the purpose of insuring a high hardness and a high toughness. If the content of the eutectic crystal-forming element is less than 5% by weight, the resulting Al-based intermetallic compound has a high hardness, but a low toughness. On the other hand, if the content of the eutectic crystal-forming element exceeds 30% by weight, the resulting Al-based intermetallic compound has a high toughness, but a low hardness.

The volume fraction Vf of the dispersion phase is set in a range of at most 50% by volume. If the volume fraction Vf of the dispersion phase exceeds 50% by volume, the resulting Al-based intermetallic compound has a high toughness, but a low hardness.

For the Al-based intermetallic compound, a sliding characteristic improving element can be contained therein to reduce the friction coefficient of the Al-based intermetallic compound. The sliding characteristic improving element is at least one element selected from the group consisting of Bi, Pb, Zn and Sn, and the volume fraction Vf thereof is set in a range of from 5% (inclusive) to 30% (inclusive). If the volume fraction Vf of the sliding characteristic improving element is less than 5%, it will fail to reduce the friction coefficient of the resulting Al-based intermetallic compound. On the other hand, if the volume fraction Vf of the sliding characteristic improving element exceeds 30%, the resulting Al-based intermetallic compound has a reduced strength. It should be noted that the sliding characteristic improving element will not hinder the increases in hardness and toughness of the Al-based intermetallic compound, if the content of the sliding characteristic improving element is within such range.

Particular examples of compounds of this embodiment now will be described.

Figure 2:
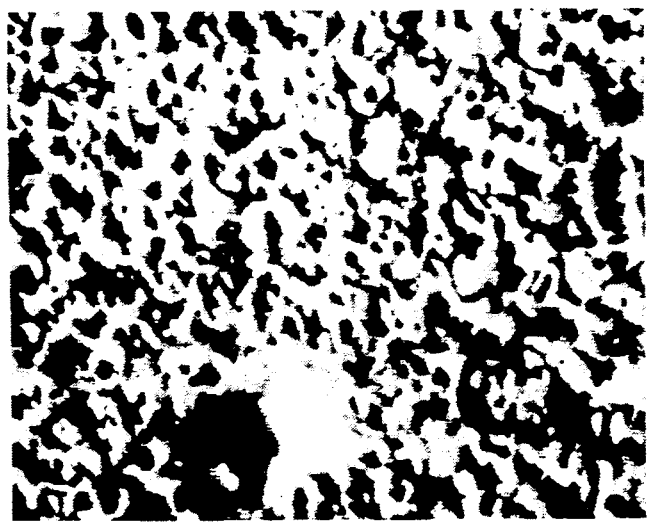
FIG. 2 is a photomicrograph showing a metallographic structure of an Al-Cu-Mn intermetallic compound.

FIG. 2 is a photomicrograph illustrating a metallographic structure of an Al-based intermetallic compound, more specifically, an Al-Cu-Mn intermetallic compound produced using Cu as a matrix phase-forming element and Mn as a eutectic crystal-forming element. In this photomicrograph, the white portion is an Al-Cu intermetallic compound matrix phase, and the black portion is a eutectic crystal type Al-Cu-Mn intermetallic compound dispersion phase (the large black portion is a dent resulting from a hardness test). In this case, an infinite number of the dispersion phases are first crystallized in a dispersed state, and the matrix phase is then crystallized.

One example of the parameters for producing this Al-Cu-Mn intermetallic compound with the process shown in FIG. 1 is as follows: Laser output = 5 kw: Spot size = 2.3 mm in diameter; Oscillator = 5 mm wide and 100 Hz; moving rate of the base material = 100 mm/min; Shield gas = He, Amount of injection thereof = $10^4$ dl/min.; Carrier gas = He, Amount of injection thereof = $11.5 \times 10^4$ dl/min.; Base material = an Al-based alloy (an A5052 material) powders of Cu and Mn being concurrently supplied.

Figure 3:
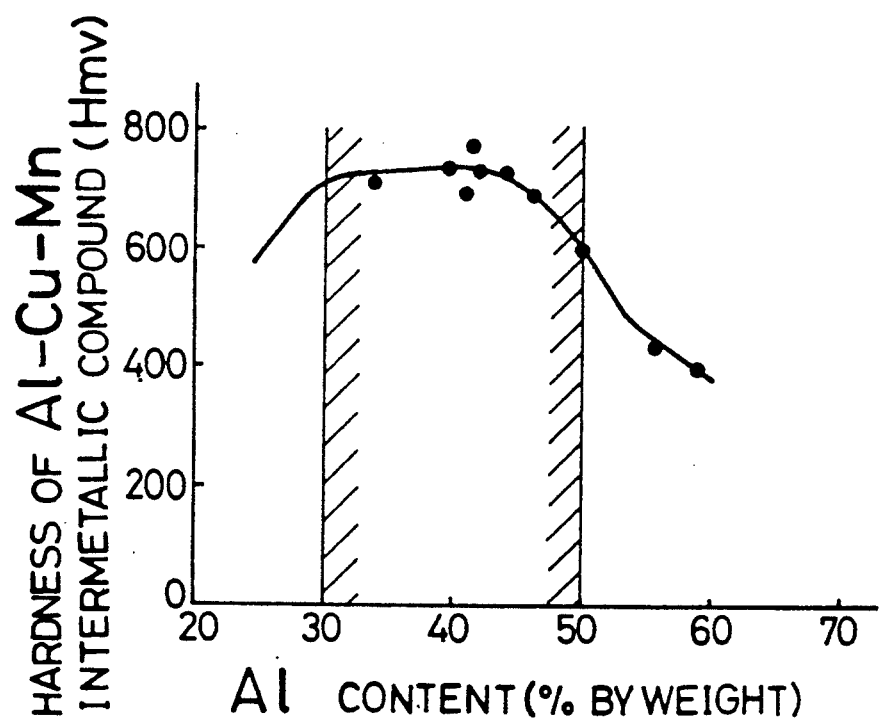
FIG. 3, is a graph illustrating a relationship between the Al content and the hardness for the Al-Cu-Mn intermetallic compound.

FIG. 3 illustrates the relationship between the Al content and the hardness for the Al-Cu-Mn intermetallic compound. The content of the elements and the volume fraction Vf of the dispersion phase in several test pieces used in measuring the hardness are as given in the following Table 1.

TABLE 1

| Test piece No. | Content (% by weight) | | | Volume fraction of the dispersion phase (%) |
| --- | --- | --- | --- | --- |
| | Al | Cu | Mn | |
| $t_1$ | 20 | 55 | 25 | 20 |
| $t_2$ | 30 | 55 | 15 | 15 |
| $t_3$ | 40 | 52 | 8 | 5 |
| $t_4$ | 50 | 40 | 10 | 8 |
| $t_5$ | 60 | 30 | 10 | 10 |

As is apparent from FIG. 3, it is possible to insure a high hardness of the resulting intermetallic compound by setting the Al content in a range of from 30% by weight (inclusive) to 50% by weight (inclusive).

Figure 4:
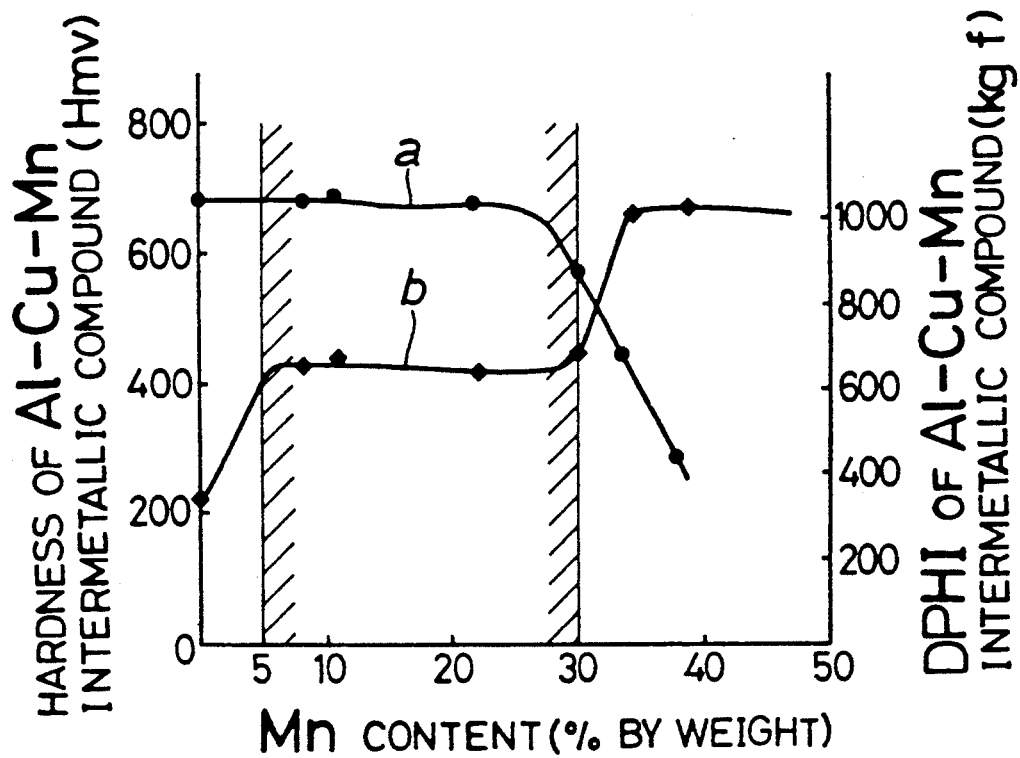
FIG. 4 is a graph illustrating a relationship between the Mn content and the hardness as well as DPHI for the Al-Cu-Mn intermetallic compound.

FIG. 4 illustrates the relationship between the Mn content and the hardness (the line a) as well as DPHI (the limit load upon the generation of cracks by a diamond penetrator) (the line b) for the Al-Cu-Mn intermetallic compound. A large value of DPHI means that the intermetallic compound has a high toughness.

The content of the elements and the volume fraction Vf of the dispersion phase in several test pieces used in measuring the hardness and DPHI are as given in Table 2.

TABLE 2

| Test piece No. | Content (% by weight) | | | Volume fraction of the dispersion phase (%) |
|---|---|---|---|---|
| | Al | Cu | Mn | |
| $t_6$ | 40 | 60 | — | — |
| $t_7$ | 40 | 55 | 5 | 7 |
| $t_8$ | 40 | 50 | 10 | 8 |
| $t_9$ | 40 | 40 | 20 | 20 |
| $t_{10}$ | 40 | 30 | 30 | 50 |
| $t_{11}$ | 40 | 20 | 40 | 70 |

As is apparent from the lines a and b in FIG. 4, it is possible to insure a high toughness and a high hardness of the resulting intermetallic compound by setting the Mn content in a range of from 5% by weight (inclusive) to 30% by weight (inclusive).

Figure 5:
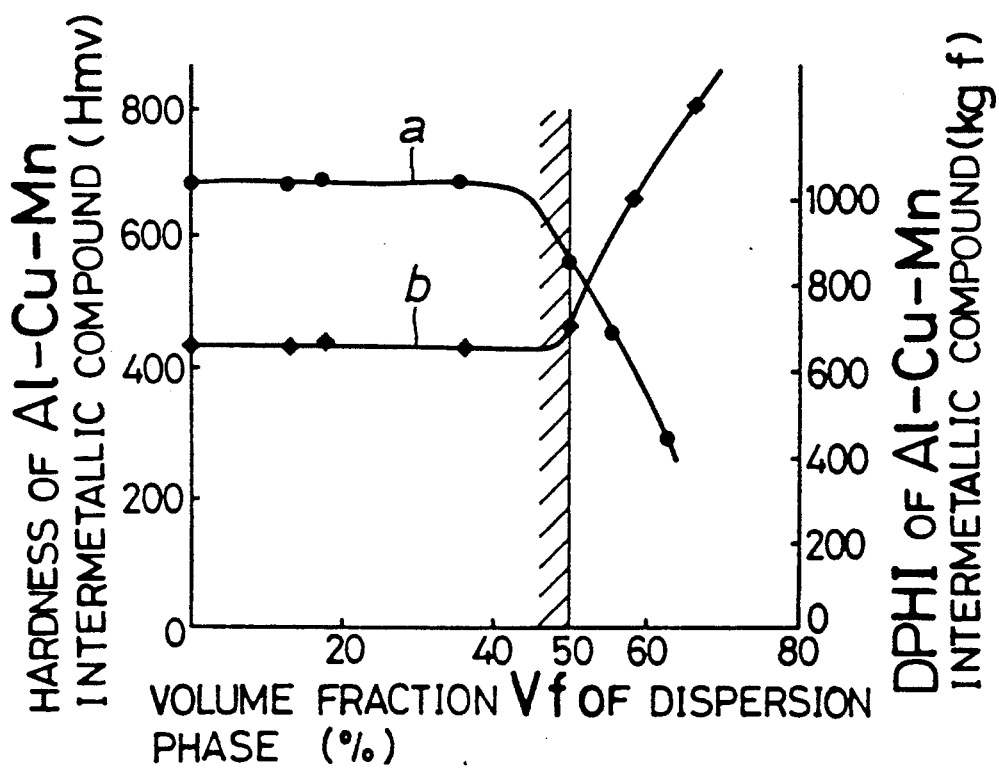
FIG. 5 is a graph illustrating a relationship between the volume fraction Vf of dispersion phases and the hardness as well as DPHI for the Al-Cu-Mn intermetallic compound.

FIG. 5 illustrates the relationship between the volume fraction Vf of the dispersion phase and the hardness (the line a) as well as DPHI (the line b) for the Al-Cu-Mn intermetallic compound.

The content of the elements and the volume fraction Vf of the dispersion phase in several test pieces used in measuring the hardness and DPHI are as given in Table 3.

TABLE 3

| Test piece No. | Content (% by weight) | | | Volume fraction of the dispersion phase (%) |
|---|---|---|---|---|
| | Al | Cu | Mn | |
| $t_{12}$ | 40 | 60 | — | — |
| $t_{13}$ | 30 | 60 | 10 | 10 |
| $t_{14}$ | 35 | 40 | 25 | 30 |
| $t_{15}$ | 30 | 40 | 30 | 50 |
| $t_{16}$ | 20 | 40 | 40 | 70 |

As is apparent from the lines a and b in FIG. 5, it is possible to insure a high toughness and a high hardness of the resulting intermetallic compound by setting the content of the dispersion phase not to exceed 50% by volume. A dispersion phase volume fraction Vf of 0 (zero) means that substantially all of Mn is in the form of a solid solution incorporated into an Al-Cu intermetallic compound matrix phase.

A second embodiment of an Al-based intermetallic compound also is produced by a process similar to that shown in FIG. 1. In carrying out this process, a base material 1 of aluminum or an Al-based alloy is moved in a direction of the arrow, and the surface thereof is melted by a laser beam 3 projected from an oscillator 2. A powder 6 consisting of a matrix phase-forming element capable of combining with Al to form an Al-based intermetallic compound matrix phase and a peritectic-forming element or envelope-forming element capable of peritectic reaction with Al to form a peritectic type Al-based intermetallic compound dispersion phase is sprayed into a molten pool 4 of such surface from a power feeder 5 by the aid of a carrier gas and at the same time, a shield gas 8 is injected from a gas feed nozzle 7 to the molten pool 4. As a result of cooling of the molten pool 4, an Al-based intermetallic compound 9 is formed on the base material 1.

The Al-based intermetallic compound 9 produced in this manner comprises an Al-based intermetallic compound matrix phase and a peritectic type Al-based intermetallic compound dispersion phase dispersed in the matrix phase. In this case, a portion of the peritectic-forming element may be incorporated in the form of a solid solution into the matrix phase. In the course of solidification of the Al-based intermetallic compound, an infinite number of peritectic type Al-based intermetallic compound dispersion phases are first crystallized, and the Al-based intermetallic compound matrix phase is then crystallized. Therefore, the matrix phase is formed into a fine crystal structure due to hindrance of the growth thereof by the peritectic type Al-based intermetallic compound dispersion phase. This makes it possible to insure a high hardness and thus a high wear resistance of the Al-based intermetallic compound.

The content of aluminum in the Al-based intermetallic compound is set in a range of from 30% by weight (inclusive) to 50% by weight (inclusive) for the purpose of insuring a high hardness of the Al-based intermetallic compound. If the aluminum content is less than 30% by weight, no matrix phase is formed, resulting in a tendency to reduce the hardness of the resulting Al-based intermetallic compound. On the other hand, if the aluminum content exceeds 50% by weight, a reduction in hardness of the resulting Al-based intermetallic compound is brought about.

The matrix phase-forming element is at least one element selected from the group consisting of Ni, Cu, Co, Fe and Mn, and the content thereof is set in a range of from 30% by weight (inclusive) to 70% by weight (inclusive) for the purpose of insuring a high hardness of the Al-based intermetallic compound. If the content of the matrix phase-forming element is less than 30% by weight, no matrix phase is formed, resulting in a tendency to reduce the hardness. On the other hand, if the content of the matrix phase-forming element exceeds 70% by weight, the resulting Al-based intermetallic compound is embrittled.

The peritectic-forming element is at least one element selected from the group consisting of Ti, Cr, Zr, V, Hf, Nb, Mo, Ta and W, and the content thereof is set in a range of from 5% by weight (inclusive) to 30% by weight (inclusive). If the content of the peritectic-forming element is less than 5% by weight, the resulting Al-based intermetallic compound has a high hardness, but a low toughness. On the other hand, if the content of the peritectic-forming element exceeds 30% by weight, the resulting Al-based intermetallic compound has a high toughness, but a low hardness.

The volume fraction Vf of the peritectic type Al-based intermetallic compound dispersion phase is set in a range of from 10% (inclusive) to 50% (inclusive) for the purpose of insuring a high hardness and a high toughness of the resulting Al-based intermetallic compound. If the volume fraction Vf of the peritectic type Al-based intermetallic compound dispersion phase is less than 10%, the resulting Al-based intermetallic compound has a high hardness, but a low toughness, as described above. On the other hand, if the volume fraction Vf exceeds 50%, the resulting Al-based intermetallic compound has a high toughness, but a low hardness.

In the Al-based intermetallic compound, a sliding characteristic improving element can be contained therein to provide a reduced friction coefficient of the resulting Al-based intermetallic compound. The sliding characteristic improving element is at least one element selected from the group consisting of Bi, Pb, Ba, Li, Sn, Sb, Sr, Ca and Tl, and the volume fraction Vf thereof is set in a range of from 5% (inclusive) to 30% (inclusive). If the volume fraction Vf of the sliding characteristic improving element is less than 5%, it will fail to reduce the friction coefficient of the resulting Al-based intermetallic compound. On the other hand, if the volume fraction Vf exceeds 30%, the resulting Al-based intermetallic compound has a reduced strength. It should be noted that the sliding characteristic improving element will not hinder increases in hardness and toughness of the resulting Al-based intermetallic compound, if the content thereof is within the above-described range.

Particular examples of compounds of this second embodiment now will be described.

Figure 6:
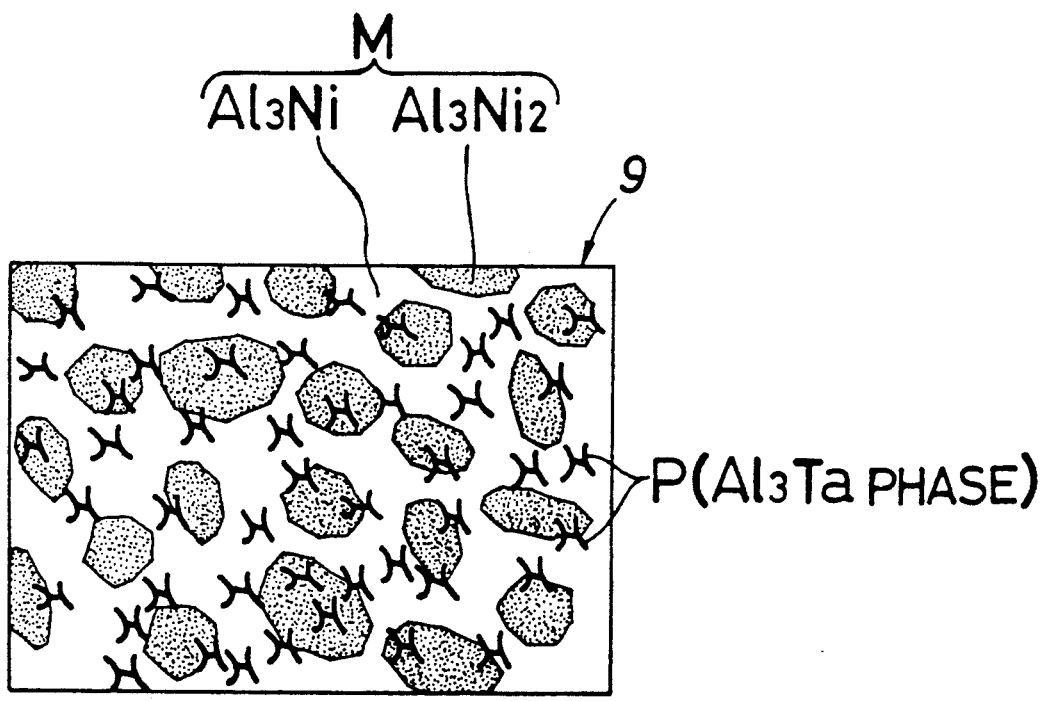
FIG. 6 is a schematic diagram showing a metallographic structure of an Al-Ni-Ta intermetallic compound.

FIG. 6 is a schematic diagram showing a metallographic structure of an Al-based intermetallic compound 9, more specifically, an Al-Ni-Ta intermetallic compound produced using Ni as a matrix phase-forming element and Ta as a peritectic-forming element. An Al-Ni intermetallic compound matrix phase M is comprised of an $Al_3Ni_2$ phase and an $Al_3Ni$ phase, and a peritectic type Al-Ta intermetallic compound dispersion phase P is comprised of an $Al_3Ta$ phase. In this case, an infinite number of $Al_3Ta$ phases are first crystallized, and then the $Al_3Ni_2$ and $Al_3Ni$ phases are sequentially crystallized.

One example of the parameters for producing such Al-Ni-Ta intermetallic compound with the process of FIG. 1 is as follows: Laser output=5 kW; Spot size=2.3 mm in diameter; Oscillator=5 mm wide and 100 Hz; Speed of movement of the base material=250 mm/min.; Shield gas=He, Amount of injection thereof=$10^4$ dl/min; Carrier gas=He, Amount of injection thereof=$11.5 \times 10^4$ dl/min; Base material=an Al-based alloy (an A5052 material); Powders of Ni and Ta being concurrently supplied.

Figure 7:
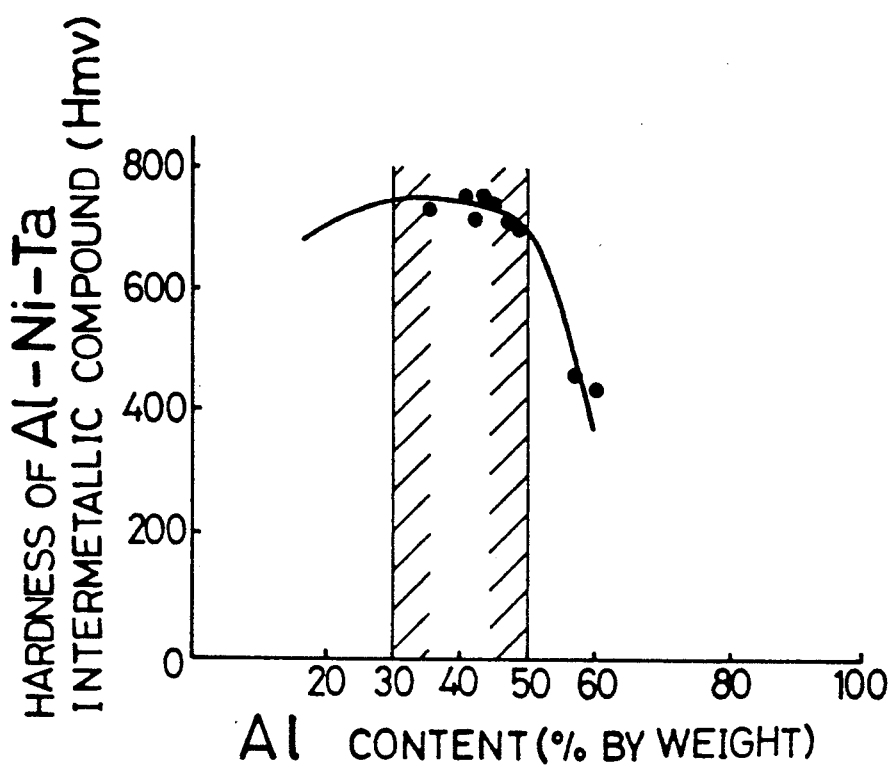
FIG. 7 is a graph illustrating a relationship between the Al content and the hardness for the Al-Ni-Ta intermetallic compound.

FIG. 7 illustrates the relationship between the Al content and the hardness for the Al-Ni-Ta intermetallic compound. The content of the elements and the volume fraction Vf of the $Al_3Ta$ phase in several test pieces used in measuring the hardness are as given in Table 4.

TABLE 4

| Test piece | Content (% by weight) | | | Volume fraction of |
|---|---|---|---|---|
| No. | Al | Ni | Ta | $Al_3Ta$ phase (%) |
| $t_{21}$ | 20 | 50 | 30 | 20 |
| $t_{22}$ | 30 | 40 | 30 | 50 |
| $t_{23}$ | 40 | 40 | 20 | 25 |
| $t_{24}$ | 50 | 40 | 10 | 15 |
| $t_{25}$ | 60 | 25 | 15 | 20 |

As is apparent from FIG. 7, it is possible to insure a high hardness of the resulting intermetallic compound by setting the Al content in a range of from 30% by weight (inclusive) to 50% by weight (inclusive).

Figure 8:
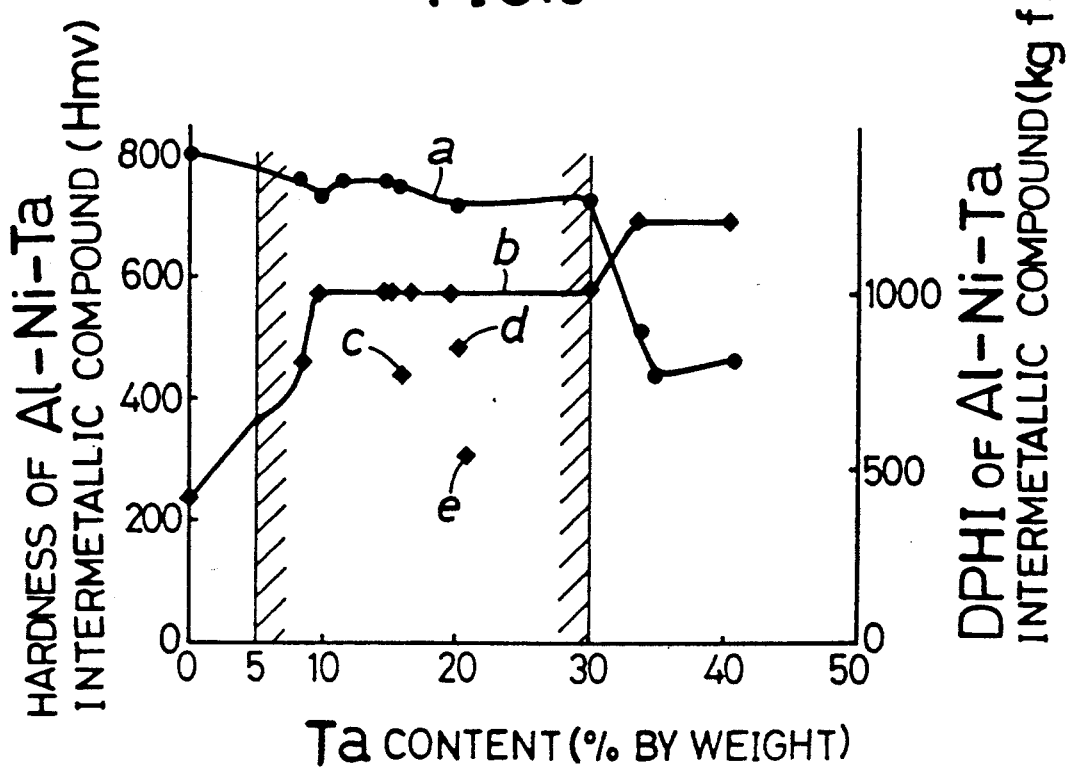
FIG. 8 is a graph illustrating a relationship between the Ta content and the hardness as well as DPHI for the Al-Ni-Ta intermetallic compound.

FIG. 8 illustrates the relationship between the Ta content and the hardness (the line a) as well as DPHI (the limit load upon the generation of cracks by a diamond penetrator) (the line b) for the Al-Ni-Ta intermetallic compound. A large value of DPHI means that the intermetallic compound has a high toughness.

The content of the elements and the volume fraction Vf of the $Al_3Ta$ phase in several test pieces used in measuring the hardness and DPHI are as given in Table 5.

TABLE 5

| Test piece | Content (% by weight) | | | Volume fraction of |
|---|---|---|---|---|
| No. | Al | Ni | Ta | $Al_3T$ phase (%) |
| $t_{26}$ | 40 | 60 | — | — |
| $t_{27}$ | 40 | 55 | 5 | 11 |
| $t_{28}$ | 40 | 50 | 10 | 18 |
| $t_{29}$ | 40 | 40 | 20 | 25 |
| $t_{30}$ | 40 | 30 | 30 | 50 |
| $t_{31}$ | 40 | 20 | 40 | 60 |

As is apparent from the lines a and b in FIG. 8, it is possible to insure a high toughness and a high hardness of the resulting Al-based intermetallic compound by setting the Ta content in a range of from 5% by weight (inclusive) to 30% by weight (inclusive).

Figure 9:
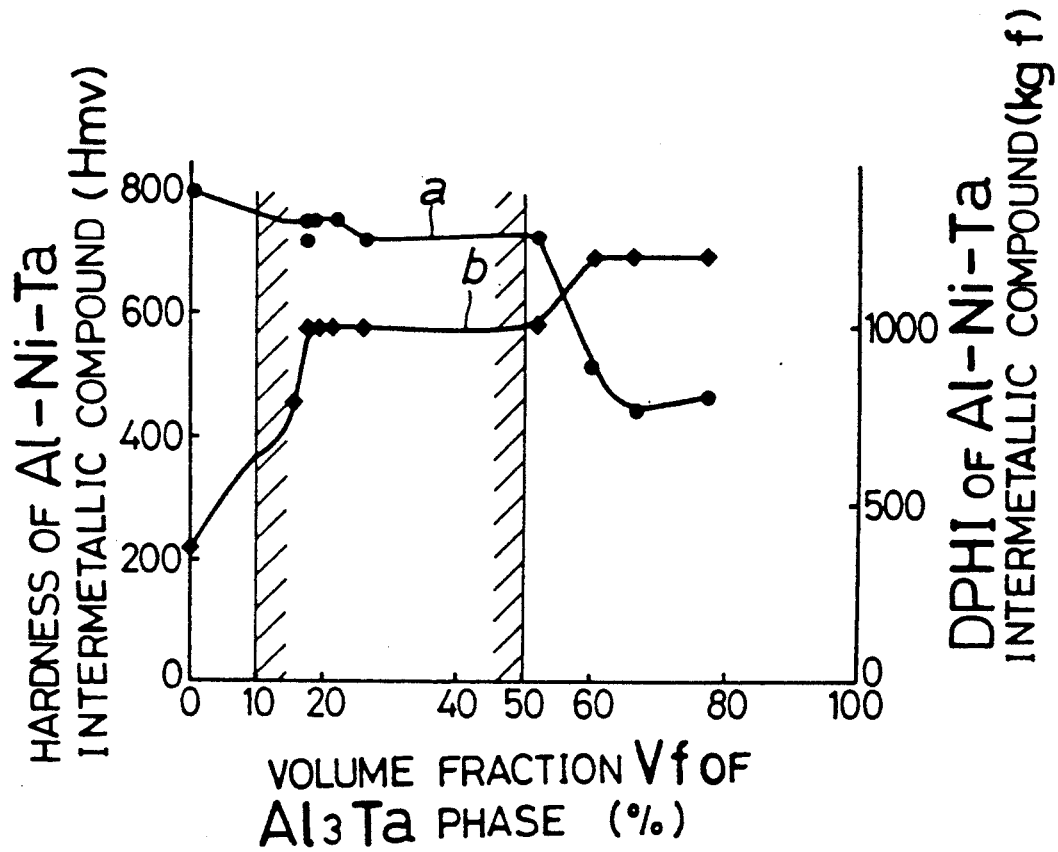
FIG. 9 is a graph illustrating a relationship between the volume fraction Vf of $Al_3Ta$ phases and the hardness as well as DPHI for the Al-Ni-Ta intermetallic compound.

FIG. 9 illustrates the relationship between the volume fraction Vf of the $Al_3Ta$ phase and the hardness (the line a) as well as DPHI (the line b) for the Al-Ni-Ta intermetallic compound.

The content of the elements and the volume fraction Vf of the $Al_3Ta$ phase in several test pieces used in measuring the hardness and DPHI are as given in Table 6.

TABLE 6

| Test piece | Content (% by weight) | | | Volume fraction of |
|---|---|---|---|---|
| No. | Al | Ni | Ta | $Al_3Ta$ phase (%) |
| $t_{32}$ | 40 | 60 | — | — |
| $t_{33}$ | 35 | 55 | 10 | 10 |
| $t_{34}$ | 40 | 40 | 20 | 25 |
| $t_{35}$ | 40 | 30 | 30 | 50 |
| $t_{36}$ | 40 | 25 | 35 | 70 |

As is apparent from the lines a and b in FIG. 9, it is possible to insure a high toughness and a high hardness of the resulting Al-based intermetallic compound by setting the volume fraction Vf of the $Al_3Ta$ phase in a range of 10% (inclusive) to 50% (inclusive).

Figure 10:
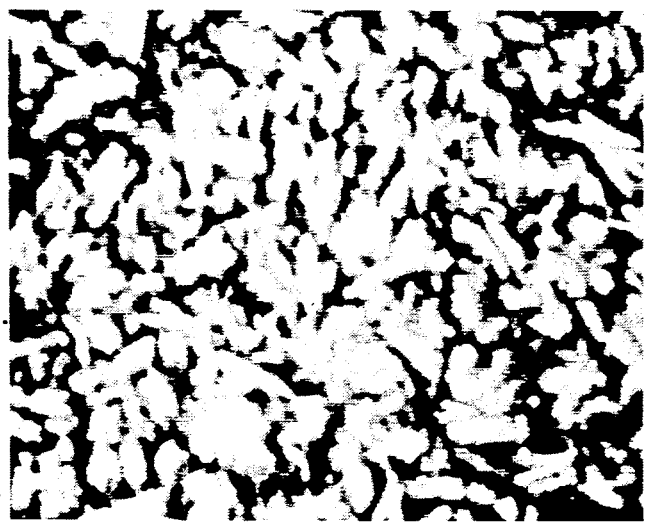
FIG. 10 is a photomicrograph showing a metallographic structure of an Al-Ni-Ta intermetallic compound.

FIG. 10 is a photomicrograph showing a metallographic structure of an Al-Ni-Ta intermetallic compound. In this photomicrograph, the white needle portion is an $Al_3Ta$ phase; the gray massive portion is an $Al_3Ni_2$ phase, and the black portion is an $Al_3Ni$ phase. The composition of this Al-based intermetallic compound comprises 40% by weight of Al, 40% by weight of Ni, and 20% by weight of Ta, and the volume fraction Vf of the $Al_3Ta$ phase in the Al-based intermetallic compound is 25%.

Figure 11:
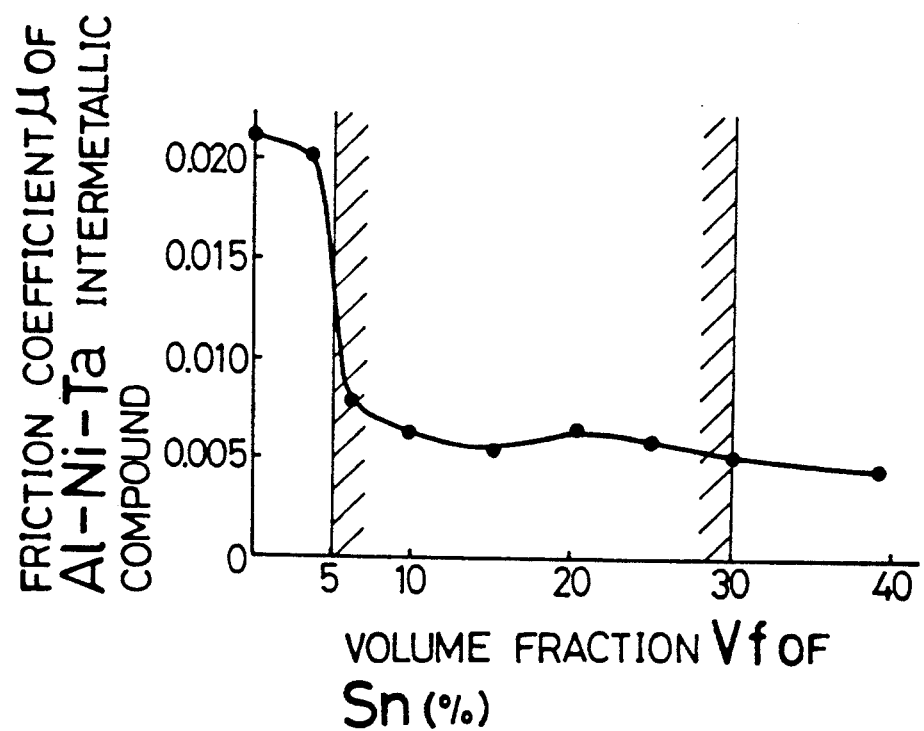
FIG. 11 is a graph illustrating a relationship between the volume fraction Vf of Sn and the friction coefficient for the Al-Ni-Ta intermetallic compound.

FIG. 11 illustrates the relationship between the volume fraction Vf of Sn and the friction coefficient for the Al-Ni-Ta intermetallic compound produced using Sn as a sliding characteristic improving element. The composition of the test piece used in measuring the friction coefficient comprises 40% by weight of Al, 40% by weight of Ni and 20% by weight of Ta, and the volume fraction Vf of the $Al_3Ta$ phase is of 10%.

As is apparent from FIG. 11, if the Sn volume fraction Vf is set in a range of from 5% (inclusive) to 30% (inclusive), it is possible to reduce the friction coefficient for the Al-based intermetallic compound without damaging the high hardness and the high toughness thereof.

Figure 12:
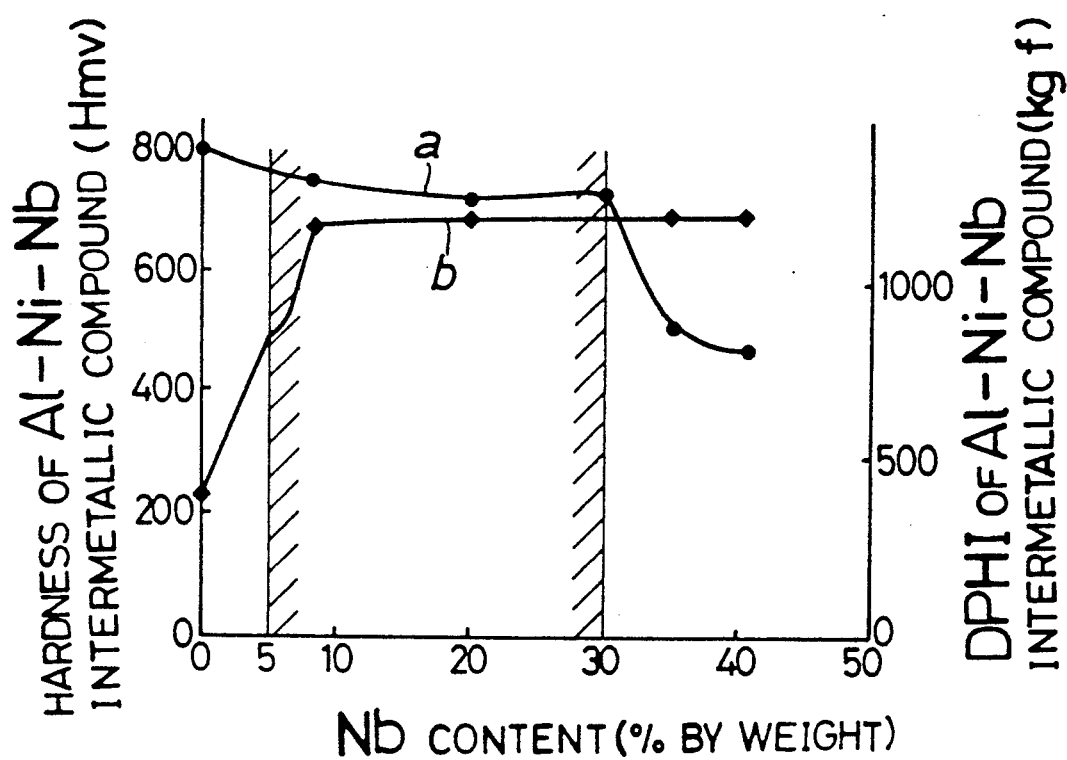
FIG. 12 is a graph illustrating a relationship between the Nb content and the hardness as well as DPHI for the Al-Ni-Nb intermetallic compound.

FIG. 12 illustrates the relationship between the Nb content and the hardness (the line a) as well as DPHI (the line b) for an Al-Ni-Nb intermetallic compound produced using Ni as a matrix phase-forming element and Nb as a peritectic-forming element. In this case, Al-Ni intermetallic compound matrix phase comprises two phases identical with those in the Al-base intermetallic compound produced using Ta, and a peritectic type an Al-Nb intermetallic compound dispersion phase comprises al $Al_3Nb$ phase.

The content of the elements and the volume fraction Vf of the $Al_3Nb$ phase in several test pieces used in measuring the hardness and DPHI are as given in Table 7.

TABLE 7

| Test piece No. | Content (% by weight) | | | Volume fraction of Al₃Nb phase (%) |
|---|---|---|---|---|
| | Al | Ni | Nb | |
| t₃₇ | 40 | 60 | — | — |
| t₃₈ | 40 | 55 | 5 | 11 |
| t₃₉ | 40 | 50 | 10 | 20 |
| t₄₀ | 40 | 40 | 20 | 25 |
| t₄₁ | 40 | 30 | 30 | 50 |
| t₄₂ | 40 | 20 | 40 | 60 |

As is apparent from the lines a and b in FIG. 12, it is possible to insure a high toughness and a high hardness for the Al-based intermetallic compound, as described above, by setting the Nb content in a range of from 5% by weight (inclusive) to 30% by weight (inclusive).

In FIG. 8, points to indicate values of DPHI (corresponding to the line b) when an element other than Ta is used as a peritectic-forming element. The other conditions such as the use of Ni as a matrix phase-forming element are the same as those when Ta is used. The point c indicates a value of DPHI when 15% by weight of W or Mo is used; the point d indicates a value of DPHI when 20% by weight of V, Nf or Zr is used; and the point e indicates a value of DPHI when 20% by weight of Ti or Cr is used.

As is apparent from the points c to e in FIG. 8, the toughness is relatively high, when the individual peritectic-forming elements are used. The hardness is substantially the same as that when Ta is used.

The peritectic type Al-based intermetallic compound dispersion phase formed by the individual peritectic-forming elements comprises a γ phase when W is used; an Al₁₂Mo phase when Mo is used; an Al₃V phase when V is used; an Al₃Hf phase when Hf is used; an Al₃Zr phase when Zr is used; an Al₃Ti phase when Ti is used; and an Al₇Cr phase when Cr is used.

The dispersion of a carbide such as CrC in the above-described Al-based intermetallic compounds is effective for providing an improvement in hardness of the Al-based intermetallic compound. In this case, the C content is suitable to be in a range of from 3% by weight (inclusive) to 20% by weight (inclusive).

It will be understood that the Al-based intermetallic compound according to the present invention is useful, for example, as a slipper surface forming material for a rocker arm in an engine and a bore wall surface forming material in a cylinder block, and may be also used as a sliding-contact surface forming material for a brake disk and a friction pad.

We claim:

1. An Al-based intermetallic compound having a high toughness and a high wear resistance, which contains an Al-based intermetallic compound matrix phase and a eutectic crystal-forming element capable of eutectic reaction with Al in an amount of from 5% by weight (inclusive) to 30% by weight (inclusive), said eutectic crystal-forming element being in at least one form selected from the forms of (1) a solid solution incorporated into the Al-based intermetallic compound matrix phase and (2) a eutectic crystal Al-based intermetallic compound dispersion phase dispersed in the Al-based intermetallic compound matrix phase, wherein:

said Al-based intermetallic compound matrix phase contains at least one element selected from a group consisting of Ni, Cu, Co, Fe and Mn as a matrix phase-forming element;

said eutectic crystal-forming element is at least one element selected from a group consisting of Ni, Cu, Co, Fe, Mn, Ag, Pd, Pt, La, Ce, Li and Mg, and said eutectic crystal-forming element is different than the matrix phase-forming element; and when said eutectic crystal Al-based intermetallic compound dispersion phase is at least one of the selected forms, the volume fraction Vf of said eutectic crystal Al-based intermetallic compound dispersion phase is present in a measurable amount less than or equal to 50%.

2. An Al-based intermetallic compound having a high toughness and a high wear resistance according to claim 1, further containing at least one element selected from a group consisting of Bi, Pb, Zn and Sn as a sliding characteristic improving element, the volume fraction Vf of said sliding characteristic improving element being set in a range of 5% to 30%.

3. An Al-based intermetallic compound having a high toughness and a high wear resistance according to claim 1, wherein the matrix phase-forming element is set in a range of 30% (inclusive) to 70% (inclusive) by weight percent.

4. An Al-based intermetallic compound having a high toughness and a high wear resistance, which contains an Al-based intermetallic compound matrix phase and one element selected from the group consisting of a eutectic crystal-forming element capable of eutectic reaction with Al and a peritectic-forming element capable of peritectic reaction with Al, said element being in an amount of 5% by weight (inclusive) to 30% by weight (inclusive), and at least a portion of said element forming an Al-based intermetallic compound dispersion phase dispersed in the Al-based intermetallic compound matrix phase, wherein:

said Al-based intermetallic compound matrix phase contains at least one element selected from a group consisting of Ni, Cu, Co, Fe and Mn as a matrix phase-forming element;

said eutectic crystal-forming element is at least one element selected from a group consisting of Ni, Cu, Co, Fe, Mn, Ag, Pd, Pt, La, Ce, Li and Mg, and said eutectic crystal-forming element is different than the matrix phase-forming element;

said peritectic-forming element is at least one element selected from a group consisting of Ti, Cr, Zr, V, Hf, Nb, Mo, Ta and W; and the volume fraction Vf of said Al-based intermetallic compound dispersion phase is set in a range of from 10% (inclusive) to 50% (inclusive).

5. An Al-based intermetallic compound having a high toughness and a high wear resistance according to claim 4, further containing at least one element selected from a group consisting of Bi, Pb, Ba, Li, Sn, Sb, Sr, Ca and Tl as a sliding characteristic improving element, the volume fraction Vf of said sliding characteristic improving element being set in a range of 5% (inclusive) to 30% (inclusive).

6. An Al-based intermetallic compound having a high toughness and a high wear resistance according to claim 4, wherein the matrix phase-forming element is set in a range of 30% (inclusive) to 70% (inclusive) by weight percent.

7. An Al-based intermetallic compound having a high toughness and wear resistance, comprising:

a. an Al-based intermetallic compound matrix phase, wherein said Al-based intermetallic compound matrix phase contains at least one element selected from a group consisting of Ni, Cu, Co, Fe and Mn as a matrix phase-forming element; and b. an eutectic crystal-forming element capable of eutectic reaction with Al, wherein:

said eutectic crystal forming element is different than the matrix phase-forming element and is at least one element selected from a group consisting of Ni, Cu, Co, Fe, Mn, Ag, Pd, Pt, La, Le, Li, and Mg; and said eutectic crystal-forming element exists in at least one form selected from the forms of (1) a solid solution incorporated into the Al-based intermetallic compound matrix phase and (2) a eutectic crystal Al-based intermetallic compound dispersion phase dispersed in the Al-based intermetallic compound matrix phase in a measurable amount less than or equal to 50% by volume fraction Vf.

8. An Al-based intermetallic compound having a high toughness and a high wear resistance according to claim 7, further containing at least one element selected from a group consisting of Bi, Pb, Zn and Sn as a sliding characteristic improving element, the volume fraction Vf of said sliding characteristic improving element being set in a range of 5% (inclusive) to 30% (inclusive).

9. An Al-based intermetallic compound having a high toughness and a high wear resistance according to claim 7, wherein the concentration of said eutectic crystal-forming element is set in a range of 5% by weight (inclusive) to 30% by weight (inclusive).

10. An Al-based intermetallic compound having a high toughness and a high wear resistance according to claim 7, wherein the concentration of said matrix phase-forming element is set in a range of 30% (inclusive) to 70% (inclusive) by weight percent.

11. An Al-based intermetallic compound having a high toughness and a high wear resistance, comprising:

a. an Al-based intermetallic compound matrix phase, wherein said Al-based intermetallic compound matrix phase contains at least one element selected from a group consisting of Ni, Ca, Co, Fe and Mn as a matrix phase-forming element; and b. a dispersion phase-forming element selected from the group consisting of a eutectic crystal-forming element capable of eutectic reaction with Al and a peritectic-forming element capable of peritectic reaction with Al, wherein:

a portion of said dispersion phase-forming element forms an Al-based intermetallic compound dispersion phase dispersed in the Al-based intermetallic compound matrix phase, and the volume fraction Vf of said Al-based intermetallic compound dispersion phase is set in a range of from 10% (inclusive) to 50% (inclusive);

said eutectic crystal-forming element is different than the matrix phase-forming element and is at least one element selected from a group consisting of Ni, Cu, Co, Fe, Mn, Ag, Pd, Pt, La, Le, Li and Mg; and said peritectic-forming element is at least one element selected from a group consisting of Ti, Cr, Zr, V, Hf, Nb, Mo, Ta, and W.

12. An Al-based intermetallic compound having a high toughness and a high wear resistance according to claim 11, further containing at least one element selected from a group consisting of Bi, Pb, Zn and Sn as a sliding characteristic improving element, the volume fraction Vf of said sliding characteristic improving element being set in a range of 5% (inclusive) to 30% (inclusive).

13. An Al-based intermetallic compound having a high toughness and a high wear resistance according to claim 11, wherein the concentration of said dispersion phase-forming element is set in a range of 5% by weight (inclusive) to 30% by weight (inclusive).

14. An Al-based intermetallic compound having a high toughness and a high wear resistance according to claim 11, wherein the concentration on said matrix phase-forming element is set in a range of 30% (inclusive) to 70% (inclusive) by weight percent.

* * * * *